Figure 1:
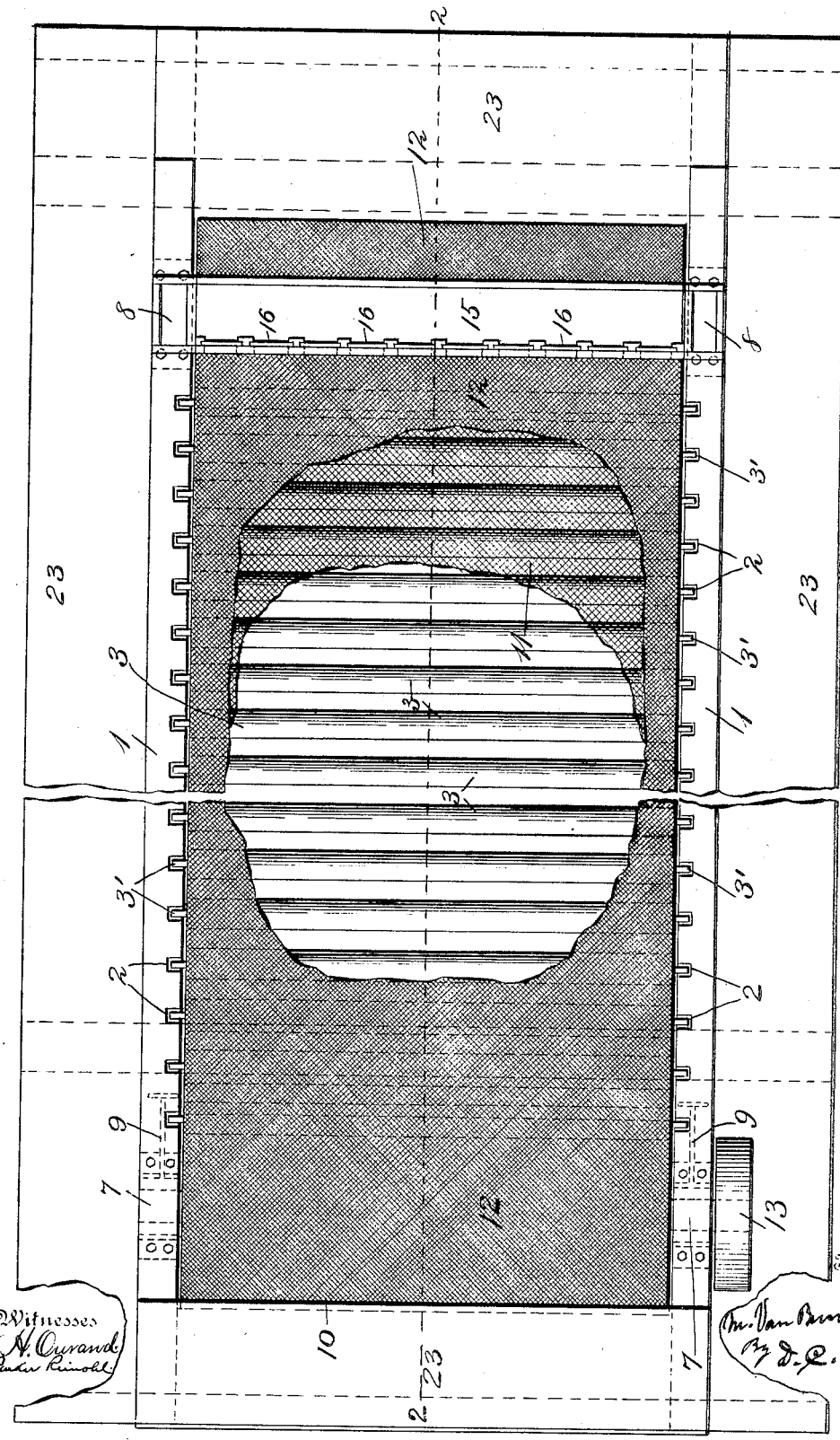

No. 817,996. PATENTED APR. 17, 1906.
M. VAN B. SMITH.
APPARATUS FOR TREATING SEWAGE.
APPLICATION FILED AUG. 18, 1905.

2 SHEETS—SHEET 1.

Witnesses
Inventor
M. Van Buren Smith
Attorney

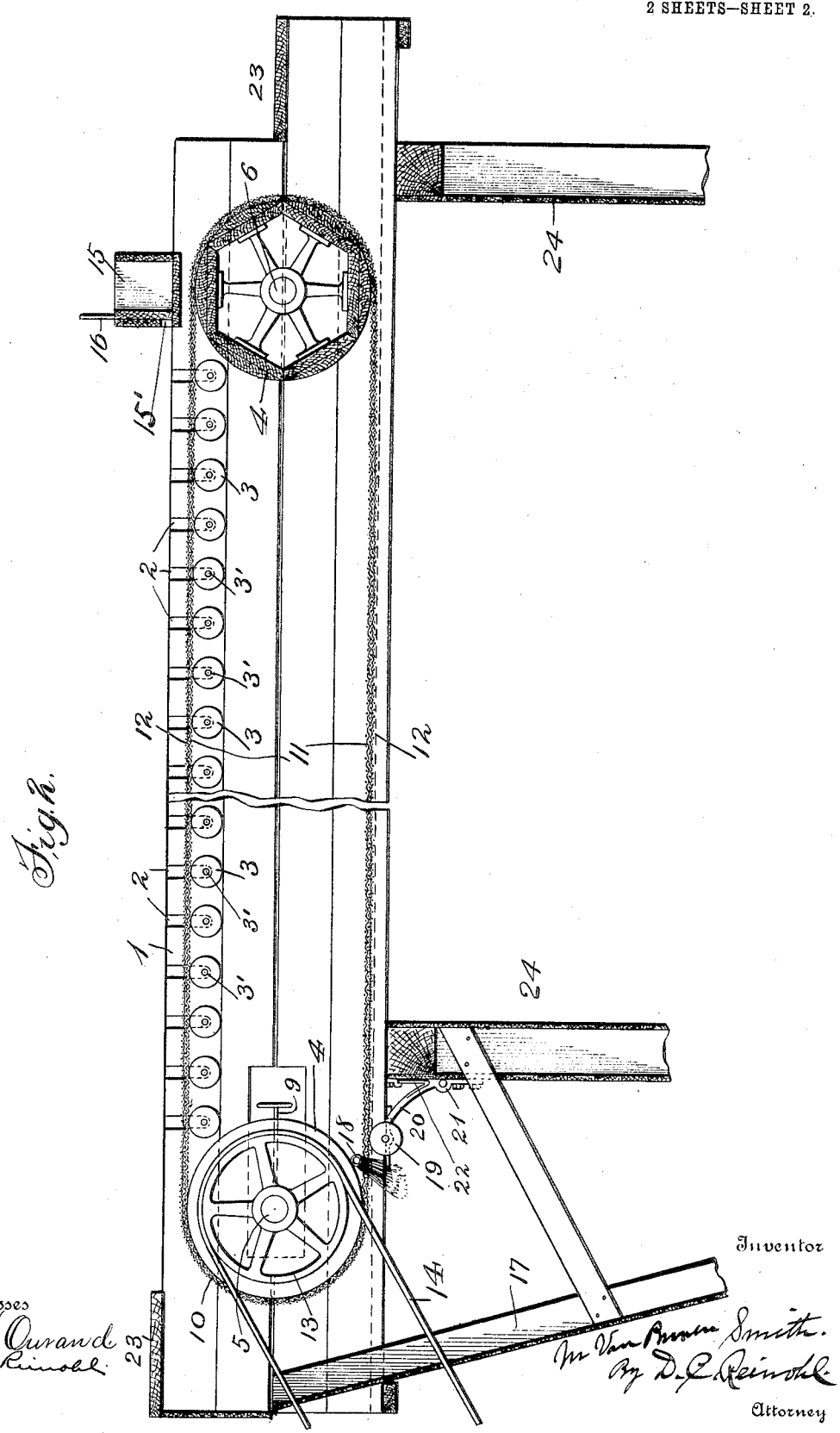

UNITED STATES PATENT OFFICE.

MARTIN VAN BUREN SMITH, OF NEW YORK, N. Y.

APPARATUS FOR TREATING SEWAGE.

No. 817,996.  Specification of Letters Patent.  Patented April 17, 1906.

Application filed August 18, 1905. Serial No. 274,648.

*To all whom it may concern:*

Be it known that I, MARTIN VAN BUREN SMITH, a citizen of the United States, residing at New York city, in the county of New York and State of New York, have invented certain new and useful Improvements in Apparatus for Treating Sewage; and I do hereby declare the following to be a full, clear, and exact description of the invention, such as will enable others skilled in the art to which it appertains to make and use the same.

My invention relates primarily to means for separating liquids from solids in material containing a mixture of the two, and particularly to the separation of water from solid matter in sewage.

My invention comprises a straining device in which a strainer is employed of a mesh so fine as practically to prevent, under ordinary circumstances, all material from passing therethrough, means being provided in contact with the under side thereof to draw the water through and discharge same, the solid material being substantially unaffected by the said means. By reason of this I am enabled to hold back substantially all of the material other than water, thus separating the water in a condition substantially free from deleterious matter. The water thus separated may then be used just as it is or it may be subjected to a filtering operation to further cleanse it, and it will be well understood that the efficiency of a filter-bed will be enormously increased by the presentation of water thereto which has already been strained to the extent to which the same is strained under my invention over the efficiency of a filter-bed to which material is presented which has not been so previously strained.

In order that my invention may be thoroughly understood, I will now proceed to describe an embodiment thereof with reference to the accompanying drawings, illustrating same, and will then point out the novel features in claims.

In the drawings, Figure 1 shows a top view of one embodiment of my invention. Fig. 2 is a view in central vertical longitudinal section thereof, the plane of section being taken substantially upon the lines 2 2 of Fig. 1.

The frame of the machine includes side pieces 1, having vertical slots 2 therein for the reception of journals 3' of transverse rollers 3 employed. Drums 4, having horizontal shafts 5 and 6, are suitably journaled in boxes 7 7 8 8 at opposite ends of the apparatus, the said journal-boxes 7 7 being adjustable by means of screws 9 9. A traveling apron or carrier 10 passes over the two drums and extends between them, the upper portion of the said apron or carrier being engaged at its under side by the said transverse rollers 3 3. By manipulation of the screws 9 9 tension of the apron or carrier may be properly adjusted.

The apron is preferably composed of two layers of wire-cloth, the upper stratum or layer 11 being the finer, having about eighty mesh to the linear inch or about six thousand four hundred openings or interstices to the square inch. The lower stratum or layer may conveniently be considerably coarser, having, say, thirty mesh to the linear inch or about nine hundred openings or interstices to the square inch. The upper mesh is so fine, and hence necessarily so fragile, that the lower coarser mesh is preferably provided for the purpose of lending strength thereto; but the two layers are in intimate contact with each other, so that combined they form, in effect, a single apron. The upper mesh is so fine that practically nothing will pass through it under ordinary circumstances. It will even hold back water, and particularly will it hold back water where the water is mixed with other materials, such as are found in the treatment of sewage. The rollers 3, however, in contact with the under surface of the apron will have the effect in their rotation of drawing the water through the apron. The surface tension of the liquid, which is sufficient to prevent the same from passing through a very fine mesh under ordinary conditions, is overcome by the physical attraction of the minute particles of the water for each other, the wet surface of the rollers acting to attract water from the material carried by the apron to draw it through the fine mesh of the apron. In actual practice I have found that while under ordinary conditions practically no water at all will pass through an apron or carrier composed of such material as above stated enormous quantities will be drawn through in a very short time by the action of the rollers against the under surface thereof.

The apron may be propelled by any suitable means through the medium of a pulley 13 and belt 14, and the material to be treated is introduced through a suitable trough 15, arranged transversely across the apron at one end thereof, said trough provided with openings 15', controlled by a gate or gates 16. The liquid from the material may be discharged at all points beneath the apron and between the drums, while the solid material is carried to the discharge end of the machine, where it is dumped into a trough 17 and from thence discharged in any suitable manner and into any suitable receptacle.

I find that as the apron passes over the delivery-roll 4 all the material is not directly discharged thereby. This is because some of the material is somewhat gelatinous in its nature and has a tendency to adhere to the apron and to hold small portions of solid material therewith. To overcome this and for the purpose of removing this material, I provide a jet-pipe 18, through which fluid under pressure, such as compressed air, is projected upon or against the apron to force away such material. In practice, however, it has been found that while this blast of air or other fluid will force the major portion of the fine particles of solid matter from the wire-cloth it will not remove all of the gelatinous substance, and to assist in the removal of this gelatinous matter I have provided a horizontal transverse roller 19, located adjacent the jet-pipe 18 and in substantial contact with the outer surface of the apron. This roller 19 serves to relieve the apron of the remaining material and is itself acted upon and cleaned by a scraper or doctor 20, hinged at 21 and held under spring tension by means of a spring 22.

The apron or carrier in its lower run becomes substantially clear between the two drums, the fluid-pressure device 18 and the roller 19 being both near the delivery-drum 4. This will leave the lower run of the apron or conveyer clear to allow water which may fall thereon from the upper run to pass through, and the water falling in a substantially clear state and in a somewhat finely-divided condition will for the most part find its way through the said lower run, the impact of its fall being sufficient to carry at least a large proportion of it through. That part which is not carried through flows over the sides and will be discharged in that way. I have also found that by the action of the water falling between the upper and lower runs of the apron or conveyer, the distance in practice being about three feet and upward, together with the subdividing of the water again as it is projected through the lower run, many of the gases contained therein will be released, such gases escaping to atmosphere, so that the water when finally delivered will be further purified and to a large extent freed from odor.

I have shown the apparatus herein as provided with a platform or walk 23 around same, so that employees may have ready access to the material being treated, the apparatus as a whole being supported by columns 24.

What I claim is—

1. In an apparatus for separating liquids from solids, the combination with a traveling apron or conveyer constructed of a material impervious to water having interstices so fine as to prevent water under normal conditions from passing therethrough, of means engaging the under surface of the apron or conveyer for drawing water through the apron and discharging it.

2. In an apparatus for separating liquids from solids, the combination with a traveling apron or conveyer constructed of a material impervious to water having interstices so fine as to prevent water under normal conditions from passing therethrough, of rollers arranged beneath the said apron or roller, with their peripheries engaging the under side of same, whereby water will be induced or drawn through the apron and discharged.

3. In an apparatus for separating liquids from solids, the combination with a traveling apron or conveyer constructed of two layers or strata, the outer layer or stratum composed of a material impervious to water having interstices so fine as to prevent water under normal conditions from passing therethrough, and the other of a perforated material having larger interstices, the two said materials being in intimate contact with each other, of rollers arranged beneath the said apron or carrier with their peripheries engaging the under side of same, whereby water will be induced or drawn through the apron and discharged.

4. An apparatus of the class described comprising an endless apron composed of separate sheets of wire-cloth, the mesh of the outer layer of wire-cloth being so fine as to prevent water under normal conditions from passing therethrough, said apron being arranged in two horizontal runs one above the other, a plurality of rollers in contact with the under side of that part of the apron forming the upper run, said rollers adapted to draw the water through the apron and discharge same, and means for cleansing the apron at about the commencement of the lower run thereof, substantially as specified.

5. An apparatus of the class described comprising an endless apron composed of separate sheets of wire-cloth, the mesh of the outer layer of wire-cloth being so fine as to prevent water under normal conditions from passing therethrough, said apron being arranged in two horizontal runs one above the other, a plurality of rollers in contact with the under side of that part of the apron forming the upper run, said rollers adapted to draw the water through the apron and discharge same, and means for cleansing the apron at about the commencement of the lower run thereof, such means comprising a fluid-pressure-applying device, and a means engaging the outer surface of the said apron or conveyer, substantially as set forth.

In testimony whereof I affix my signature in presence of two witnesses.

MARTIN VAN BUREN SMITH.

Witnesses:
D. C. REINOHL,
W. PARKER REINOHL.